March 1, 1960  K. GEBELE  2,926,589
PHOTOGRAPHIC CAMERA STRUCTURE
Filed May 25, 1956  2 Sheets-Sheet 1
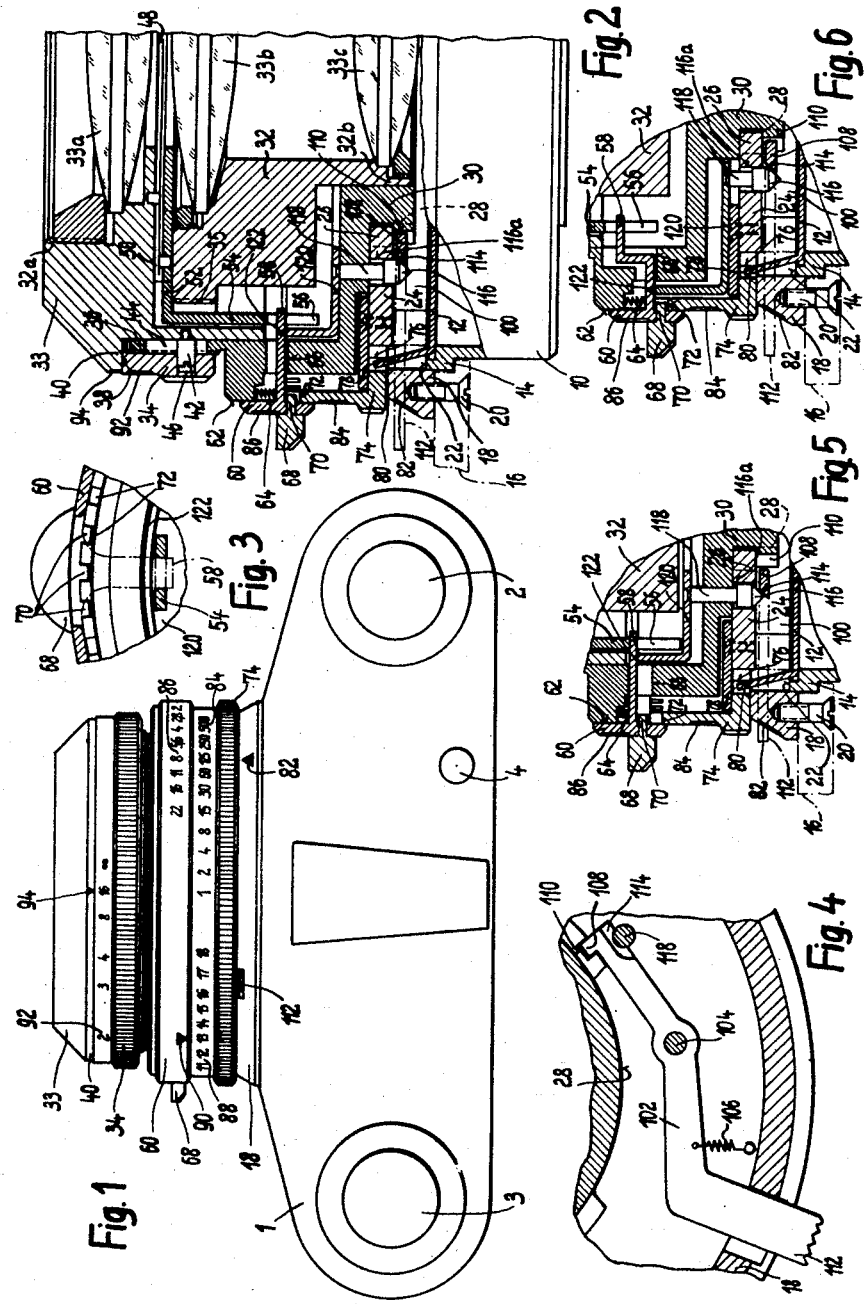

March 1, 1960 K. GEBELE 2,926,589
PHOTOGRAPHIC CAMERA STRUCTURE
Filed May 25, 1956 2 Sheets-Sheet 2
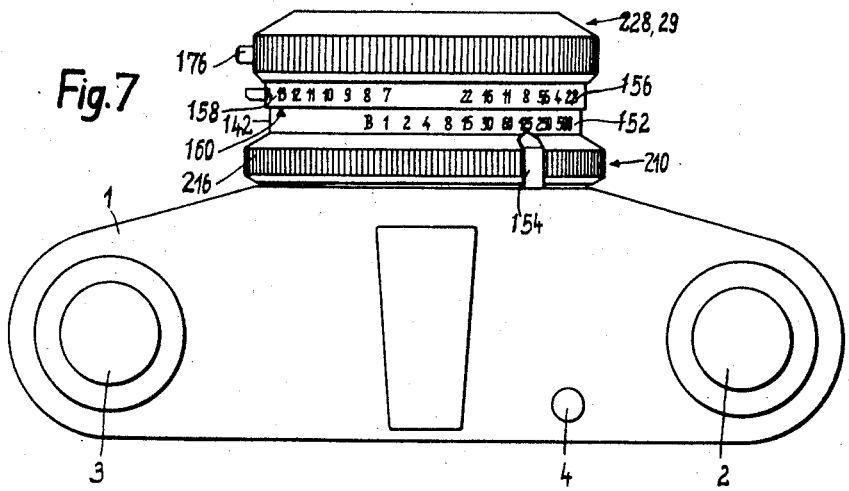
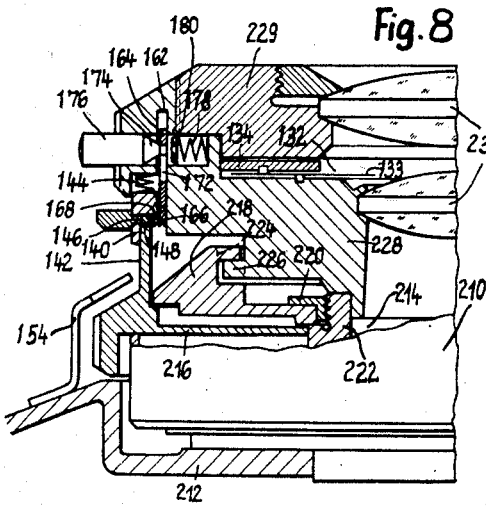
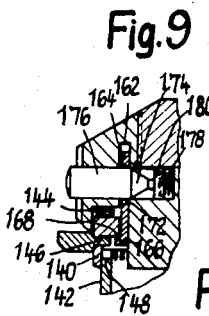
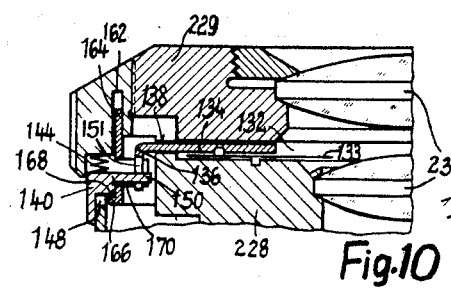
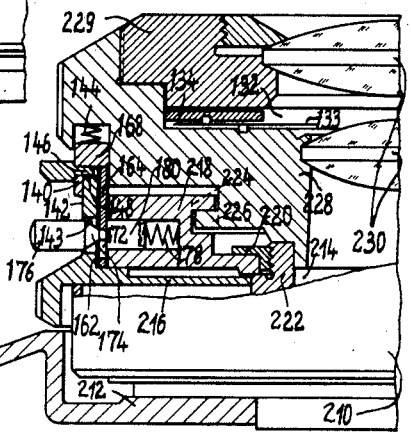

United States Patent Office 2,926,589
Patented Mar. 1, 1960

2,926,589

PHOTOGRAPHIC CAMERA STRUCTURE

Kurt Gebele, Munich, Germany, assignor, by mesne assignments, to Compur-Werk Friedrich Deckel OHG., Munich, Germany, a firm of Germany Application May 25, 1956, Serial No. 587,235

Claims priority, application Germany June 1, 1955

11 Claims. (Cl. 95—64)

This invention relates to a photographic camera structure, and particularly to a camera in which either the shutter unit or the lens mount unit is interchangeable and disconnectable from the other unit, and in which coupling means is provided for coupling the motion of the shutter speed adjusting member on the shutter unit to the diaphragm aperture adjusting member on the lens mount unit.

An object of invention is the provision of a generally improved and more satisfactory structure of this kind.

Another object is the provision of simple means for uncoupling the coupling connection between the diaphragm adjusting member and the shutter speed adjusting member, when the two units are to be separated from each other.

Still another object is the provision of uncoupling means which is operated automatically by the grasping of one of the units when it is to be disconnected from the other unit.

A further object is the provision of a lock for holding one unit firmly in position relative to the other unit, to avoid accidental disconnection thereof, in combination with means operated automatically by disconnection of the lock, for simultaneously uncoupling the coupling means which couples the shutter speed adjusting member on one unit to the diaphragm aperture adjusting member on the other unit.

These and other desirable objects may be attained in the manner disclosed as an illustrative embodiment of the invention in the following description and in the accompanying drawings forming a part hereof, in which:

Fig. 1 is a top plan view of a camera equipped with a shutter unit and a lens mount unit in accordance with a preferred embodiment of the invention;

Fig. 2 is a fragmentary radial section through a portion of the shutter unit and lens mount unit;

Fig. 3 is a transverse section through a fragment of the construction shown in Fig. 2, illustrating additional details;

Fig. 4 is a fragmentary transverse section through part of the structure shown in Fig. 2;

Fig. 5 is a view similar to a fragment of Fig. 2, showing the parts in a different position, with the uncoupling or decoupling means fully operated;

Fig. 6 is a view similar to Fig. 5 showing another embodiment of the invention;

Fig. 7 is a view similar to Fig. 1 showing still another embodiment of the present invention;

Fig. 8 is a fragmentary radial section through the shutter unit and lens mount unit of Fig. 7, with the uncoupling mechanism in its normal rest position;

Fig. 9 is a view similar to a fragment of Fig. 8 showing the uncoupling mechanism in its effective position to cause uncoupling of the parts;

Fig. 10 is a fragmentary radial section through a portion of the same structure but taken on a different radius from that of Figs. 8 and 9, to show additional details; and Fig. 11 is a view similar to Fig. 8 illustrating another embodiment of the invention.

The same reference numerals throughout the several views indicate the same parts.

The present applicant has previously developed various forms or embodiments of camera structures which include a shutter unit having a shutter speed setting member, and a lens mount unit having a diaphragm aperture setting member, the two units being separable from each other when desired, and having means for coupling the shutter speed setting member to the diaphragm aperture setting member in various positions of adjustment or orientation relative to each other, so that these two adjusting members will move together. Examples of such constructions are shown in certain of applicant's copending United States patent applications such as Serial No. 512,189, filed May 31, 1955 (now Patent 2,889,761, issued June 9, 1959); Serial No. 522,332, filed July 15, 1955, now Patent No. 2,887,937; Serial No. 536,584, filed September 26, 1955; Serial No. 542,603, filed October 25, 1955; and Serial No. 559,058, filed January 13, 1956 (issued August 4, 1959, as Patent 2,897,739).

The prior constructions as disclosed in said copending applications are satisfactory in general. The two units (that is, the shutter unit and the lens mount unit) are ordinarily detachably connected to each other by means of a bayonet joint or connection, requiring one unit to be turned or rotated relative to the other, about the optical axis as a center of rotation, in order to effect disconnection of the parts. In some instances there is a possibility that the coupling between the shutter speed setting member on the shutter unit and the diaphragm aperture setting member on the lens mount unit may interfere with the necessary rotation to effect coupling and uncoupling of the units, particularly if one of the setting members is at or near one end or limit of its possible travel, at the time that the units are to be disconnected from or connected to each other.

The present invention obviates any difficulties of this nature, by providing for a decoupling or uncoupling of the adjusting members of the respective units from each other, in a very simple and easy manner, when the units are to be disconnected or detached from each other.

Referring first to the embodiment of the invention illustrated in Figs. 1–5 of the present drawings, the invention is here shown as applied to a shutter unit and lens mount unit of substantially the same construction (except for the parts added in accordance with the present invention) as that disclosed in applicant's said Patent No. 2,887,937. For simplicity, the corresponding parts of the present structure are identified by the same reference numerals used for corresponding parts in said copending application just mentioned, and the description of these parts in the present specification will be somewhat abbreviated, reference being made to said copending application for any further description desired.

The camera body is shown somewhat diagrammatically at 1. It is of a conventional known type, having a film winding knob 2, a film rewinding knob 3, and a shutter trigger or body release button 4. On the front wall 16 of the camera body there is an objective shutter unit the main housing of which is indicated in general at 10 which may, if desired, be detachably mounted on the camera, but in the form here shown is permanently mounted thereon and is embraced within an encircling ring member 18 secured to the camera wall 16 by screws 20. A portion 22 of the ring 18 overlies the front edge of the shutter housing, securing it against axial movement. An inwardly extending flange portion 24 on the ring 18 carries bayonet projections 26 which mate in the usual detachable manner with bayonet lugs 28 on a part 30 of the lens mount unit. This lens mount unit includes three main parts 30, 32, and 33, the latter two parts being firmly screwed to each other by the screw threads 35 and being axially movable relative to the part 30, for purposes of focusing. A front threaded support 32a on the part 33 has a retaining ring which holds the front lens component 33a in place. Behind this is another lens component 33b, and a third lens component 33c is held by a retaining ring screwed into the screw threads 32b at the rear end of the part 32.

A smooth exterior surface on the part 33 slides axially in a smooth interior surface on the part 30. Axial movement for focusing is produced by rotation of a focusing ring 34 threaded on external threads on the part 36 of the member 30. The forward end 38 of the focusing ring 34 contacts with an overhanging shoulder 40 on the part 33. One or more radial pins 42 secured to the part 33 pass through axial slots 44 in the part 36 and enter an internal circumferential groove 46 in the focusing ring 34, so that only the axial component of the motion of the focusing ring 34 is transmitted to the part 33, and no rotation of the part 33 is possible.

The diaphragm or stop, preferably of the iris type, includes the usual diaphragm leaves or blades 48, located in the cavity or space 50 between the lens components 33a and 33b. The diaphragm is adjusted or set to different apertures by rotary movement of a ring 52 which turns about the optical axis of the lens as a center of rotation, and which has an angularly bent arm 54 extending rearwardly parallel to the optical axis, which arm is provided with an axial slot 56, somewhat longer than the range of axial displacement of the lens mount members 32 and 33. Engaged in this axial slot 56 is a radial driving tongue 58 on an externally accessible actuating member in the form of a coupling ring 60 which is rotatable on the exterior cylindrical surface 62 of the mount member 30 and which is also capable of limited axial movement relative to this mount member, being constantly urged rearwardly by a few springs 64 placed at intervals around the ring 60. Rotation of this ring 60, through the tongue 58 and its connection with the arm 54, serves to turn the interior diaphragm aperture setting ring 52, thereby to adjust the size of the diaphragm aperture.

The shutter speed is adjustable by turning a speed adjusting ring 12 mounted near the front of the shutter housing, and rotatable about the optical axis in known manner. This speed setting member has a forwardly bent driving tongue 80 which engages in a slot 78 of an external speed setting ring 74 rotatable on a cyclindrical projection 76 of the stationary ring member 18, 24. Any rotary motion of the ring 74 (about the optical axis as a center of rotation) is transmitted by the slot 78 and tongue 80 to the internal shutter speed adjusting member 12.

The external diaphragm setting ring 60 is normally coupled in an adjustable or variable manner to the external shutter speed setting ring 74. For instance, the ring 60 may be provided with a convenient finger piece 68 riveted to the ring 60 and having a shank which extends inwardly beyond the inner wall of the ring 60 to form a coupling tooth 70 which may be engaged with any selected one of a series of coupling notches 72 formed at the forward edge of the speed setting ring 74. The radial portion 58 of the ring 60 extends through a slot 66 in the mount member 30, which slot 66 is sufficiently wide in an axial direction so that the ring 60 may be moved bodily forwardly against the pressure of the springs 64, to disengage the tooth 70 from the notch 72 in which it has been seated, after which the ring 60 may be turned relative to the ring 74 and then may move rearwardly again under the influence of the spring 64, to seat the tooth 70 in a different one of the notches 72, thereby varying the relative orientation of the rings 60 and 74.

The arrangement of the various setting scales is best seen in Fig. 1. The stationary ring 18 carries an index mark or reference point 82, in connection with which are read both the linearly divided shutter speed scale 84 on the shutter speed setting ring 74, and the linearly divided diaphragm aperture scale 86 on the coupling ring or diaphragm aperture setting ring 60. These scales, when read with reference to the mark 82, indicate the absolute values of the shutter speed setting and the diaphragm aperture setting. The relative values or position of orientation of the rings 60 and 74 with respect to each other, may be read by means of a linearly divided brightness scale or exposure value scale 88 marked on the ring 74 and read in conjunction with an index mark or reference point 90 marked on the ring 60. The focusing distance scale 92 marked on the focus adjusting ring 34 is read in conjunction with an index mark or reference point 94 marked on the portion 33 of the lens mount unit.

The parts thus far described are substantially the same as those shown in said Patent No. 2,887,937. It will be apparent that when the lens mount unit is to be removed from the shutter unit, the coupling of the ring 60 on the lens mount unit to the ring 74 on the shutter unit may sometimes interfere with the rotation of the lens mount unit to a sufficient extent to disconnect the bayonet connection parts 26, 28, particularly if the rings happen to be near the end or limit of their rotational range of travel. The present invention overcomes any difficulty which might arise from this cause, in a very simple manner, and at the same time provides an effective lock for holding the lens mount unit firmly in position on the shutter unit, against any possibility of accidental disengagement.

In the cavity 100 between the bayonet ring 24 and the shutter speed setting ring 12, there is a locking lever 102 rotatable on a fixed pivot 104 parallel to the optical axis, and extending rearwardly from the stationary ring 24. A spring 106 constantly tends to turn the locking lever 102 in a counterclockwise direction when viewed as in Fig. 4, to hold the inner end 108 thereof engaged in a notch 110 formed in the member 28, 30 of the lens mount unit. When the end of the locking lever is engaged in this notch, the lens mount unit cannot turn relative to the shutter unit; therefore the bayonet connection cannot become accidentally released.

The other end of the locking lever 102 extends approximately radially outwardly through a suitable slot in the ring 18, to form an externally accessible finger piece or push member 112. By pressing against this member 112 in a direction approximately radially inwardly toward the optical axis, the locking lever 102 is swung against the force of the spring 106, to release the end 108 from the notch 110, so that the lens mount unit can be turned relative to the shutter unit, to disconnect the bayonet connection between these parts.

The locking lever 102 is provided, near its locking end 108, with an inclined cam surface 114 which engages the tapered conical end 116 of a pin 118 which extends parallel to the optical axis and is slidable axially through a guiding opening in the part 30 of the lens mount unit. The forward end of this pin 118 is firmly connected, as by riveting, with a decoupling or uncoupling ring 120 which is capable of limited axial travel in a space between the parts 30 and 32 of the lens mount unit. At its outer edge, the ring 120 has a forwardly extending flange 122, the forward end of which underlies the radial portion 58 of the coupling ring 60, as well seen in Fig. 2.

When the parts are in normal rest position, with the lens mount unit mounted on the shutter unit, the uncoupling ring 120, 122 is in its rearmost position as illustrated in Fig. 2. In this position of the parts, the ring 120, 122 does not interfere with the coupling of the ring 60 to the ring 74. However, when the operator desires to disconnect the lens mount unit from the shutter unit, he must press approximately radially inwardly on the finger piece 112 of the locking lever 102. This swings the locking lever so that the inclined surface 114 thereof, engaging the tapered or conical rear end 116 of the pin 118, forces this pin axially forwardly, thereby causing axial forward movement of the ring 120 so that the edge 122 thereof presses forwardly on the portion 58 of the coupling ring 60, forcing this coupling ring forward against the force of the spring 64, to the position shown in Fig. 5. Thus the ring 60 is automatically uncoupled from the ring 74, so that there can be no interference with the turning of the lens mount unit to a sufficient extent to disconnect the bayonet connection thereof with the shutter unit.

The parts of the locking lever 102 are so arranged that the pin 118 is forced fully to its forward position, before the end 108 of the locking lever completely leaves the notch 110. Thus the decoupling of the rings 60 and 74 is completed before the lens mount unit is unlocked and can be turned, thereby avoiding any possibility of damaging the parts.

Since there must be relative rotary motion (about the optical axis as a center) between the pin 118 and the stationary member 24 when the lens mount unit is being mounted on or detached from the shutter unit, the plate 24 is provided with an arcuate slot 116a through which the pin 118 extends, the slot being of sufficient length to accommodate the necessary range of travel of the pin when the bayonet connection is loosened or tightened. The inclined cam surface 114 of the locking lever 102 is preferably extended in a circumferential direction far enough to maintain contact with the end of the pin 116 during the entire range of rotary motion of the lens mount unit when connecting it to or disconnecting it from the shutter unit.

In the embodiment of Figs. 1–5, the decoupling ring 120 is mounted within the lens mount unit and remains with the lens mount unit when the latter is removed from the shutter unit. In the alternative construction shown in Fig. 6, a similar result is achieved but the decoupling ring is here mounted on and remains with the shutter unit of the camera, when the two units are disconnected from each other. As shown in Fig. 6, the decoupling ring 120 is mounted in a space between the stationary bayonet ring 24 and the part 30 of the lens mount unit, and the forwardly extending flange 122 of the decoupling ring extends forwardly outside the lateral edge of the part 30, instead of inside the part 30. Its forward edge engages the radial arm 58 on the ring 60, just as before, and the action is otherwise the same as previously described.

It is also possible, of course, to mount the decoupling pin 118 directly on the flange 58 of the ring 60, instead of having it secured to a separate decoupling ring.

Still another embodiment of the invention is illustrated in Figs. 7–10 of the drawings, this embodiment being somewhat simpler than the embodiments previously described, in that the decoupling mechanism is all carried entirely by the lens mount unit, thus enabling such mechanism to be incorporated in new lens mount units adapted for use with old shutter units which make no provision for the decoupling mechanism.

In this embodiment of Figs. 7–10, the camera body itself is shown diagrammatically the same as in Fig. 1, and the parts are identified by the same numerals 1–4, inclusive. The shutter unit itself is indicated in general at 210, and may be attached to the front wall 212 of the camera body, either by a permanent connection or by a detachable bayonet joint connection, an example of a bayonet joint connection of the shutter unit to the camera body being shown in said copending patent application, Serial No. 536,584, filed September 26, 1955. Whether the shutter unit is connected permanently or detachably to the camera, in either event, the construction of the shutter unit and the lens mount unit may be substantially the same as disclosed in said application Serial No. 536,584, except for the decoupling means of the present invention, as further explained below. Reference is made to said copending application just mentioned, for a more complete description of the shutter unit and the lens mount unit, which may be briefly described as follows.

The shutter unit 210 has a shutter speed adjusting ring 216 mounted for rotation near the front of the shutter unit, about the optical axis as a center of rotation. Conveniently the speed adjusting ring 216 turns on the exterior of the front lens tube 222 of the shutter unit, which lens tube is externally threaded to receive a nut 220 which holds in place a front cover plate 218 provided with bayonet connection lugs 224 adapted to mate in the usual manner with bayonet connection lugs 226 on the portion 228 of the lens mount unit. This lens mount unit has two main parts or portions 228 and 229 connected in fixed position relative to each other, and both removable together from the shutter unit when the bayonet connection parts 224 and 226 are disengaged. The lens mount unit carries any desired number of lens components 230.

In the space 132 between the parts 229 and 228 of the lens mount unit, there is an adjustable diaphragm or stop, preferably of the iris type, embodying a series of adjustable diaphragm leaves or blades 133, the positions of which are adjusted by turning a ring 134 rotatable about the optical axis as a center. The ring 134 has a radial arm 136 which, as best seen in Fig. 10, extends laterally outwardly through a slot 138 and then has an end bent rearwardly and provided with a slot 151 parallel to the optical axis. In this slot is engaged a radial projection or tongue 150 on a coupling ring 140 which turns on a suitable cylindrical surface of the mount part 228 and also is capable of limited axial movement on this part, being constantly pressed rearwardly by a few springs 144 spaced at intervals around the circumference of the mount.

When the ring 140 is in its rearward position, a coupling tooth 146 thereof is seated in one or another of the coupling notches 148 formed in the forward edge of a cylindrical flange 142 which extends forwardly from the shutter speed adjusting ring 216. Thus the shutter speed adjusting ring 216 and the diaphragm aperture adjusting ring 34 are coupled to each other, to turn together. But when the coupling ring 140 is pushed axially forwardly, against the force of the springs 144, the tooth 146 is disengaged from the notches 148 and may be turned independently of the flange 142 of the speed setting ring 216, to a new or different position of orientation relative to the speed setting ring.

The arrangement of the scales is best shown in Fig. 7, and is quite similar to that shown in Fig. 1 in connection with the first embodiment of the invention. The linearly divided shutter speed scale 152 is marked on the cylindrical flange portion 142 of the shutter speed adjusting member 216, and is read in conjunction with a fixed index mark or reference point 154. The linearly graduated diaphragm aperture scale 156 is marked on the periphery of the coupling ring 140, and is likewise read in conjunction with the same reference mark 154. These two scales, when read opposite the point 154, give the absolute values of shutter speed and diaphragm aperture for which the parts are set at any given time. The relative values of diaphragm aperture and shutter speed, independently of the absolute values thereof, are shown by an exposure value scale 158 marked on the ring 140 and read in conjunction with an index mark or reference point 160 marked on the flange 142 of the shutter speed setting ring.

This much of the construction shown in Figs. 7–10, as thus far described, may be substantially the same as the construction in said last mentioned copending application, Serial No. 536,584. The present invention provides decoupling means in connection with such construction, as follows:

An annular slot 162 is provided in the lens mount part 228, and in this slot there is axially movable a cylindrical ring 164 having at its rear edge an outwardly projecting shoulder or ledge 166 which lies behind the shoulder 168 of the coupling ring 140, in such manner that whenever the ring 164 is moved axially forwardly, it carries the ring 140 axially forwardly with it, but the ring 140 may move forwardly independently of the ring 164. The decoupling ring 164 has a suitable peripheral slot 170 (Fig. 10) through which the radial arm 150 of the ring 140 passes, the slot 170 being sufficiently long in a circumferential direction so that it does not interfere with turning the ring 140 through its entire range, and sufficiently wide in an axial direction so that it does not interfere with full axial movement of the ring 140.

The decoupling ring 164 also has an axially extending slot 172, in which is a tapered or frusto-conical inner end 174 of a push pin 176 mounted for radial movement in a radial bore of the lens mount part 228. A spring 178 at the inner end of this bore pushes radially outwardly on the inner end of the pin 176, and the pin 176 has suitable retaining means to prevent it from being pushed further outwardly than the position shown in Fig. 8. Conveniently this is accomplished by enlarging the inner end of the pin 176 at 180, to provide a sufficient bearing area for engaging the end of the spring 178 and also to provide a stop to prevent accidental movement of the pin 176 too far outwardly in a radial direction.

When the operator desires to change the lens mount unit, he usually grips the unit by placing his fingers circumferentially around the milled or serrated rib which extends around the mount near the front thereof. Thus, almost unconsciously and without special effort on the part of the operator, the pressure of his fingers in grasping the lens mount unit to turn it, presses inwardly on the protruding end of the pin 176, so that the pin is forced radially inwardly against the force of the spring 178. The tapered or frusto-conical part 174 of the pin, acting as a cam against the forward edge of the slot 172 of the decoupling ring 164, causes this ring 164 to move axially forwardly, thereby producing axial forward movement of the coupling ring 140 against the force of the springs 144, which in turn uncouple the tooth 146 from the notches 148. The lens mount unit may then be turned freely to disconnect the bayonet connection mounting parts, without danger of damage to the coupling between the shutter speed adjusting mechanism and the diaphragm aperture adjusting mechanism, and without any impediment from the normally coupled parts even if they happen to be near the ends of their ranges of rotary motion. It is therefore very easy to twist or turn the lens mount unit as required to mount it on or demount it from the shutter unit.

Another modification of the construction is illustrated in Fig. 11 of the drawings. This is in general similar to the modification just described in connection with Figs. 7–10, but differs therefrom in that the decoupling parts are here mounted on and stay with the shutter unit, instead of being mounted on and staying with the removable lens mount unit. The annular slot 162 is here formed in the part 218 of the shutter unit, rather than in the part 228 of the lens mount unit. The axially movable ring 164 is mounted in this annular slot 162, and at its forward end presses against an overhanging shoulder 168 on the coupling ring 142, so as to move the coupling ring forwardly to decoupled position, when the radial pin 176 is pressed radially inwardly against the force of its spring 178. As before, the pin has a tapered or conical portion 174 which acts as a cam to move the annular ring 164 forwardly. It may be added that this pin 176, in this form of the construction, extends through the flange 142 of the shutter speed setting ring 216, so this flange 142 is provided with a circumferentially extending slot 143 to permit passage of the pin 176 without interfering with the rotary motion of the speed setting ring.

One push pin 176 at one point on the periphery of the structure has been shown in the drawings, but it is obvious that a plurality of such push pins, mounted at different points around the periphery, circumferentially spaced from each other, may be used if desired.

In all forms of the invention as described, the shutter unit is, of course, provided with the usual movable shutter blades which are actuated by the mechanism within the shutter housing, in conventional manner, to open and close the exposure aperture.

The decoupling means or mechanism of the present invention may obviously be applied equally well to various other forms of construction in which a shutter speed setting or adjusting member and a diaphragm aperture adjusting member are normally coupled to each other and are to be disconnected when one part or unit is to be detached from another part or unit. For example, the lens mount unit may be placed next to the camera body and a detachable shutter unit may be placed in front of it, this being merely a reversal of the construction here illustrated. Or again, the shutter speed adjusting member may be mounted directly on the camera body (to control, for example, a focal plane shutter or slit shutter) and may be normally coupled to a diaphragm aperture adjusting member on a detachable lens mount unit which, when in normal operating position, is attached directly to the camera body rather than to an interposed shutter unit.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera structure including a shutter unit and a lens mount unit detachably secured to each other, a shutter speed adjusting member movably mounted on said shutter unit, a diaphragm aperture adjusting member movably mounted on said lens mount unit, a coupling tooth on one of said members, a series of coupling notches on the other of said members, both of said members being rotatable around the optical axis of said lens mount unit for purposes of adjustment, one of said members being movable axially with respect to said optical axis to engage said coupling tooth with and disengage it from one of said coupling notches, spring means tending to hold said axially movable one of said members in coupled relation to the other of said members, and manually movable means responsive to manual pressure exerted in a direction substantially different from an axial direction for moving said axially movable one of said members to uncoupled relation to the other of said members and for holding said members in uncoupled relation as said units are detached from one another.

2. A photographic camera structure including a shutter unit and a lens mount unit detachably secured to each other, a shutter speed adjusting member movably mounted on said shutter unit, a diaphragm aperture adjusting member movably mounted on said lens mount unit, a coupling tooth on one of said members, a series of coupling notches on the other of said members, both of said members being rotatable around the optical axis of said lens mount unit for purposes of adjustment, one of said members being movable axially with respect to said optical axis to engage said coupling tooth with and disengage it from one of said coupling notches, spring means tending to hold said axially movable one of said members in coupled relation to the other of said members, and manually movable means responsive to manual pressure exerted in a direction substantially different from an axial direction for moving said axially movable one of said members to uncoupled relation to the other of said members and for holding said members in uncoupled relation as said units are detached from each other, said manually operable means including an axially movable pin operatively coupled with said axially movable one of said members and having a tapered part acting as a cam.

3. A photographic camera structure including a shutter unit and a lens mounting unit detachably secured to each other, a shutter speed adjusting member movably mounted on said shutter unit, a diaphragm aperture adjusting member movably mounted on said lens mount unit, a coupling tooth on one of said members, a series of coupling notches on the other of said members, both of said members being rotatable around the optical axis of said lens mount unit for purposes of adjustment, one of said members being movable axially with respect to said optical axis to engage said coupling tooth with and disengage it from one of said coupling notches, spring means tending to hold said axially movable one of said members in coupled relation to the other of said members, and decoupling means including a manually operable actuating member mounted on one of said units and movable substantially radially inwardly toward said optical axis for moving said axially movable one of said members to uncouple it from the other of said members and to hold said members in uncoupled relation as said units are detached.

4. A photographic camera structure including a shutter unit and a lens mount unit detachably secured to each other, a shutter speed adjusting member movably mounted on said shutter unit, a diaphragm aperture adjusting member movably mounted on said lens mount unit, a coupling tooth on one of said members, a series of coupling notches on the other of said members, both of said members being rotatable around the optical axis of said lens mount unit for purposes of adjustment, one of said members being movable axially with respect to said optical axis to engage said coupling tooth with and disengage it from one of said coupling notches, spring means tending to hold said axially movable one of said members in coupled relation to the other of said members, a movable locking element movable between a released position and a locking position in which said two units are locked to each other, and means operated by movement of said locking element to released position for moving said axially movable one of said members to uncouple it from the other of said members.

5. A photographic camera structure including a shutter unit and a lens mount unit detachably secured to each other, a shutter speed adjusting member movably mounted on said shutter unit, a diaphragm aperture adjusting member movably mounted on said lens mount unit, a coupling tooth on one of said members, a series of coupling notches on the other of said members, both of said members being rotatable around the optical axis of said lens mount unit for purposes of adjustment, one of said members being movable axially with respect to said optical axis to engage said coupling tooth with and disengage it from one of said coupling notches, spring means tending to hold said axially movable one of said members in coupled relation to the other of said members, an approximately radially movable plunger mounted on one of said units and having a tapered portion, and means operated by said tapered portion upon movement of said plunger radially inwardly toward said optical axis for moving said axially movable one of said members to uncouple it from the other of said members and for holding said members in uncoupled relation as said units are detached.

6. A photographic camera structure including an externally accessible shutter speed adjusting ring rotatable about an optical axis, an externally accessible diaphragm aperture adjusting ring also rotatable about said optical axis, axially directed releasable coupling means between said rings, one of said rings being movable relative to the other in the direction of said optical axis for coupling the two rings to each other for joint rotatary movement and for uncoupling them from each other for independent rotary movement, a third internally mounted ring movable axially with respect to said optical axis and having a portion for engaging one of said first two mentioned rings for moving it axially to uncoupled position, and means for moving said third ring axially.

7. A construction as defined in claim 6, further including a shutter unit on which said speed adjusting ring is mounted, a lens mount unit on which said aperture adjusting ring is mounted, and means forming a releasable bayonet connection between said two units.

8. A construction as defined in claim 7, further including movable locking means for locking said bayonet connection, said means for moving said third ring axially being operatively coupled to said locking means to be operated by movement thereof.

9. A construction as defined in claim 6, in which said means for moving said third ring axially includes a pin coupled to said third ring and having a tapered portion.

10. A photographic camera structure including a shutter unit and a lens mount unit detachably secured to each other, a shutter speed adjusting member movably mounted on said shutter unit, a diaphragm aperture adjusting member movably mounted on said lens mount unit, releasable means for coupling said two adjusting members to each other for conjoint movement when said two units are in normal secured position, both of said members being rotatable about the optical axis of said lens mount unit for purposes of adjustment, one of said members being movable axially with respect to said optical axis to engage and disengage said coupling means, spring means tending to hold said axially movable one of said members in coupled relation to the other of said members, and manually movable means responsive to manual pressure exerted in a direction substantially different from an axial direction for moving said axially movable one of said members to uncoupled relation to the other of said members and for holding said members in uncoupled relation as said units are detached.

11. A photographic camera structure including a shutter unit and a lens mount unit detachably secured to each other, a shutter speed adjusting member movably mounted on said shutter unit, a diaphragm aperture adjusting member movably mounted on said lens mount unit, releasable coupling means between said members for coupling said members for conjoint movement when in normal secured position, both of said members being rotatable around the optical axis of said lens mount unit for purposes of adjustment, one of said members being movable axially with respect to said optical axis to engage and disengage said coupling means, spring means tending to hold said axially movable one of said members in coupled relation to the other of said members, a locking lever pivoted to said shutter unit for movement between a locked position locking said two units together and a released position freeing said lens mount unit for removal, and an axially movable pin operatively connected to said axially movable one of said members and having a tapered portion acting as a cam, said tapered portion being engaged by said locking lever during movement to said released position for moving said axially movable one of said members to uncouple it from the other of said members.

References Cited in the file of this patent

UNITED STATES PATENTS

| | | |
|---|---|---|
| 1,945,999 | Sabel | Feb. 6, 1934 |
| 2,190,729 | Nerwin | Feb. 20, 1940 |
| 2,596,328 | Dorsey | May 13, 1952 |
| 2,649,024 | Goldhamer | Aug. 18, 1953 |

FOREIGN PATENTS

| | | |
|---|---|---|
| 1,090,214 | France | Oct. 13, 1954 |
| 744,962 | Great Britain | Feb. 15, 1956 |
| | (Corresponding to above French patent) | |
| 310,855 | Switzerland | Jan. 14, 1956 |